June 10, 1930. J. TEIPEL 1,762,203
CONNECTING DEVICE FOR STORAGE BATTERIES
Filed Oct. 11, 1922

INVENTOR
Joseph Teipel.
By Bakewell & Church
ATTORNEYS

Patented June 10, 1930

1,762,203

UNITED STATES PATENT OFFICE

JOSEPH TEIPEL, OF ST. LOUIS, MISSOURI, ASSIGNOR TO MANCHA STORAGE BATTERY LOCOMOTIVE COMPANY, OF ST. LOUIS, MISSOURI, A CORPORATION OF DELAWARE

CONNECTING DEVICE FOR STORAGE BATTERIES

Application filed October 11, 1922. Serial No. 593,766.

This invention relates to devices such as are used for electrically connecting an electric storage battery with a machine or apparatus which the battery energizes.

The main object of the invention is to provide a device of the kind referred to which is constructed in such a manner that an unauthorized person cannot break the electrical connection between a storage battery and the apparatus which it energizes without mutilating the device or changing the condition of same to such an extent that it is readily apparent that the device has been tampered with.

To this end I have devised a connecting device for the purpose described which consists of a receptacle fastened to a battery box and electrically connected to the battery in the box, a plug electrically connected to a motor or other apparatus and adapted to be inserted in said receptacle so as to establish electrical connection between the battery and the motor, and means for preventing an unauthorized person from withdrawing said plug from said receptacle.

Figure 1 of the drawing is a horizontal longitudinal sectional view of a device embodying my invention.

Figure 1:
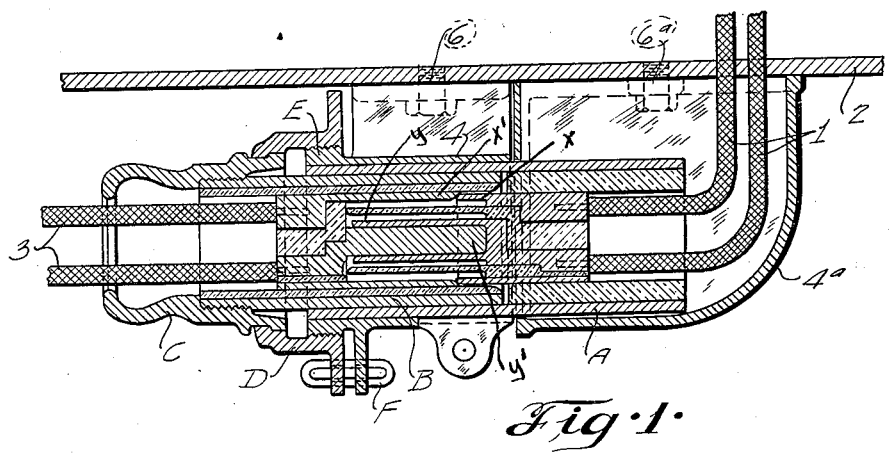

Referring to the drawings which illustrate the preferred form of my invention, A designates a receptacle equipped with contacts $x$ and $y$ that are electrically connected by wires 1 to a storage battery arranged in a box whose side wall is designated by the reference character 2, and B designates a plug equipped with contacts $x'$ and $y'$ electrically connected by wires 3 to a motor (not shown) and adapted to be moved endwise into the receptacle A so as to establish electrical connection between the storage battery and the motor.

Figure 2:
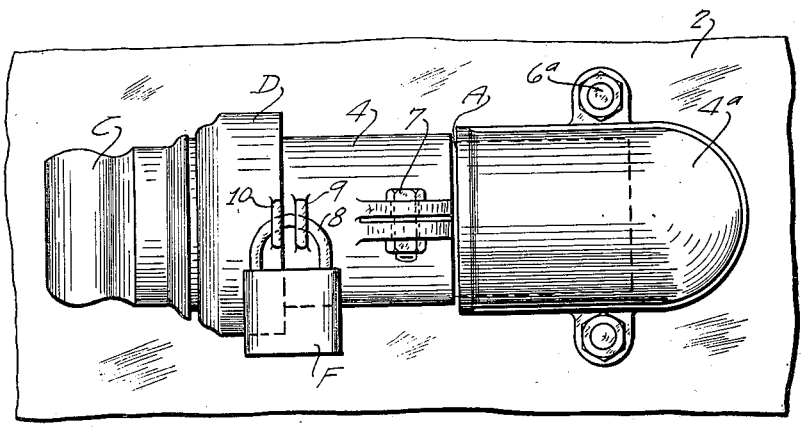
Figure 2 is a side elevational view of said device.
Figure 3:
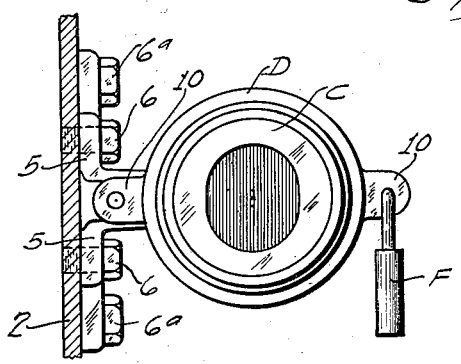
Figure 3 is a front elevational view of the device.

The receptacle A is mounted in a carrier formed preferably by a split sleeve 4 and an elbow-shaped member $4^a$, both of which are connected to the battery box. The sleeve 4 is provided with brackets 5 that are connected to the side wall 2 of the battery box by fastening devices 6, said sleeve 4 being equipped with an adjusting device 7, shown in Figure 2, that is adapted to be tightened so as to cause the sleeve to securely clamp and hold the receptacle A. The elbow-shaped member $4^a$ houses and protects the wires 1 at the point where they lead into the battery box and said member $4^a$ is secured to the side wall of the battery box by fastening devices $6^a$ and is arranged in sufficiently close proximity to the right hand end of the sleeve 4 to prevent the receptacle A from being moved to the right so as to disconnect the contacts $x$ and $y$ thereon from the contacts $x'$ and $y'$ on the plug B.

The plug B is equipped with a cap C and means is provided for locking said plug in operative position in the receptacle A. In the form of my invention herein illustrated said locking means comprises a ring D swiveled onto the cap C and provided with internal screw threads, an externally screw-threaded portion E on the receptacle holder 4 onto which the locking ring D is adapted to be screwed and a padlock or other suitable sealing device F provided with a hasp or other part 8 that is adapted to be inserted through a lug 9 on the receptacle holder 4 and through a co-operating lug 10 on the locking ring D, said locking ring being preferably provided with a plurality of lugs 10, so as to provide for variations in the locked position of the ring D, due to wear of the co-operating threads on said ring and on the receptacle holder 4. When the battery is to be recharged the locking device F is removed, the ring D is unscrewed from the holder 4 and the plug B is withdrawn from the receptacle, thereby permitting a plug (not shown) connected to a charging circuit, to be inserted in the receptacle A during the operation of re-charging the battery. After the battery has been re-charged, the plug of the charging circuit is withdrawn from the receptacle A, and the plug B is inserted in said receptacle and locked by means of the device F so as to prevent an unauthorized person breaking the electrical connection between the motor and the battery that energizes same.

The device above described was designed for use on storage battery mine locomotives to prevent the operator in charge of a mine locomotive from disconnecting the motor from the battery while the motor is in the mine, and thus creating an electric spark that might result in an explosion in the event there is a gas leak in the mine. I wish it to be understood, however, that the device is not limited to use on electric storage battery locomotives, as it is capable of use in any place where it is necessary or desirable to prevent two co-operating circuit closing devices from being disengaged by an unauthorized person.

Having thus described my invention, what I claim as new and desire to secure by Letters Patent is:

1. In an electric storage battery, the combination of an electric receptacle element provided with contacts that are electrically connected with the battery, a removable plug element provided with co-operating contacts and adapted to be slid endwise into said receptacle, a holder stationarily mounted on the exterior of the box of said battery for supporting said receptacle element, a rotatable part swiveled on the plug element and permanently connected to same, co-operating screw threads on said rotatable part and holder for maintaining the plug in operative position in the receptacle, and means for enabling said rotatable part to be locked to said holder.

2. In an electric storage battery, the combination of an electric receptacle provided with contacts that are electrically connected with the battery, a removable plug provided with co-operating contacts and adapted to be moved endwise into said receptacle, a stationary holder on the exterior of the box of the battery for supporting said receptacle, a cap secured to said plug, a locking ring permanently swiveled onto said cap, co-operating screw threads on said ring and holder that are adapted to be engaged by a rotary movement of the ring so as to retain the plug in the receptacle, and means for preventing an unauthorized person from rotating said ring so as to release the plug and permit it to be withdrawn from the receptacle.

JOSEPH TEIPEL.